United States Patent
Cyr et al.

(10) Patent No.: US 10,613,282 B2
(45) Date of Patent: *Apr. 7, 2020

(54) FLUID CONTROL STRUCTURE

(71) Applicant: INTERNATIONAL BUSINESS MACHINES CORPORATION, Armonk, NY (US)

(72) Inventors: Elaine Cyr, Bromont (CA); Paul F. Fortier, Bromont (CA); Takashi Hisada, Kawasaki (JP); Patrick Jacques, Bromont (CA); Koji Masuda, Kawasaki (JP); Masao Tokunari, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,453

(22) Filed: Apr. 9, 2018

(65) Prior Publication Data

US 2018/0259729 A1    Sep. 13, 2018

Related U.S. Application Data

(63) Continuation of application No. 15/452,128, filed on Mar. 7, 2017, now Pat. No. 9,989,713.

(51) Int. Cl.
*G02B 6/42* (2006.01)

(52) U.S. Cl.
CPC .......... *G02B 6/4239* (2013.01); *G02B 6/423* (2013.01); *G02B 6/4214* (2013.01); *G02B 6/4238* (2013.01); *G02B 6/4245* (2013.01); *G02B 6/4246* (2013.01); *G02B 6/4249* (2013.01)

(58) Field of Classification Search
CPC .......................... G02B 6/4238; G02B 6/4239
See application file for complete search history.

(56) References Cited

U.S. PATENT DOCUMENTS

| | | | |
|---|---|---|---|
| 6,509,636 B1 * | 1/2003 | Tsai | H01L 23/10 257/678 |
| 7,476,955 B2 * | 1/2009 | Street | H01L 27/14618 257/434 |
| 10,018,781 B1 | 7/2018 | Masuda et al. | |
| 2005/0275741 A1 | 12/2005 | Watanabe et al. | |
| 2012/0049388 A1 | 3/2012 | Pagaila | |
| 2014/0086532 A1 | 3/2014 | Droesbeke et al. | |
| 2015/0355409 A1 * | 12/2015 | Yanagisawa | G02B 6/322 385/14 |

(Continued)

OTHER PUBLICATIONS

U.S. Office Action issued in U.S. Appl. No. 15/701,960, dated Mar. 7, 2018, pp. 1-14.

(Continued)

*Primary Examiner* — Omar R Rojas
(74) *Attorney, Agent, or Firm* — Tutunjian & Bitetto, P.C.; Vazken Alexanian

(57) ABSTRACT

An optical structure includes a substrate including a cavity on a first surface of the substrate, an optical component on the substrate and an adhesive applied to a side of the optical component to fix the optical component to the substrate. The optical component includes a recess on a second surface of the optical component, the second surface is opposed to the first surface of the substrate, and the recess is provided along an edge of the second surface.

15 Claims, 14 Drawing Sheets

(56) References Cited

U.S. PATENT DOCUMENTS

2015/0364444 A1    12/2015   Scanlan et al.
2017/0322376 A1    11/2017   Wu et al.
2019/0060951 A1    2/2019   Zenou
2019/0195797 A1    6/2019   Cai et al.

OTHER PUBLICATIONS

List of IBM Patents or Patent Applications Treated as Related dated Apr. 9, 2018, 2 pages.
U.S. Office Action issued in U.S. Appl. No. 15/701,960 dated Nov. 19, 2018, 16 pages.
Notice of Allowance Issued in U.S. Appl. No. 15/701,960 dated Mar. 27, 2019, 10 pages.

\* cited by examiner

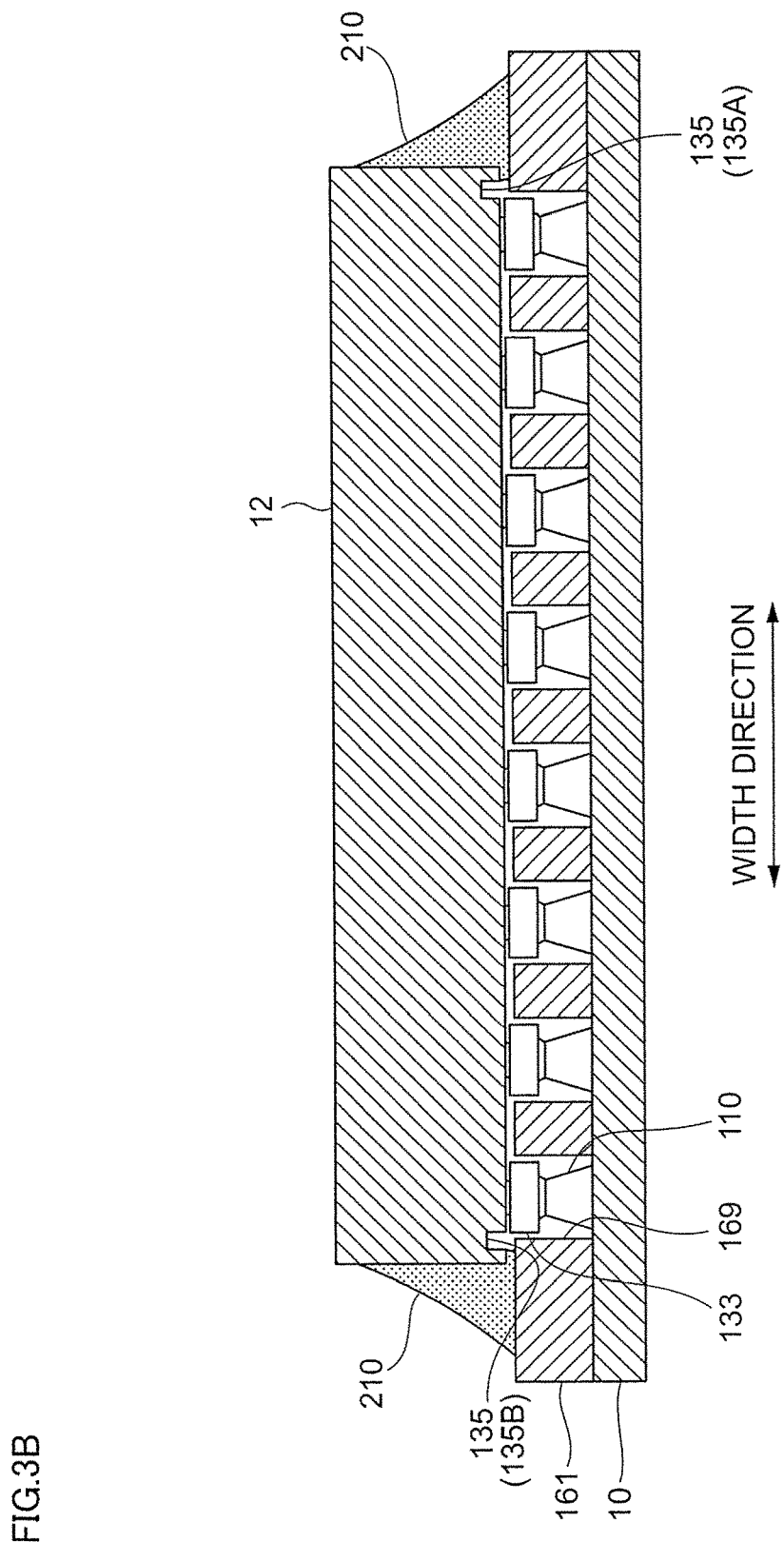

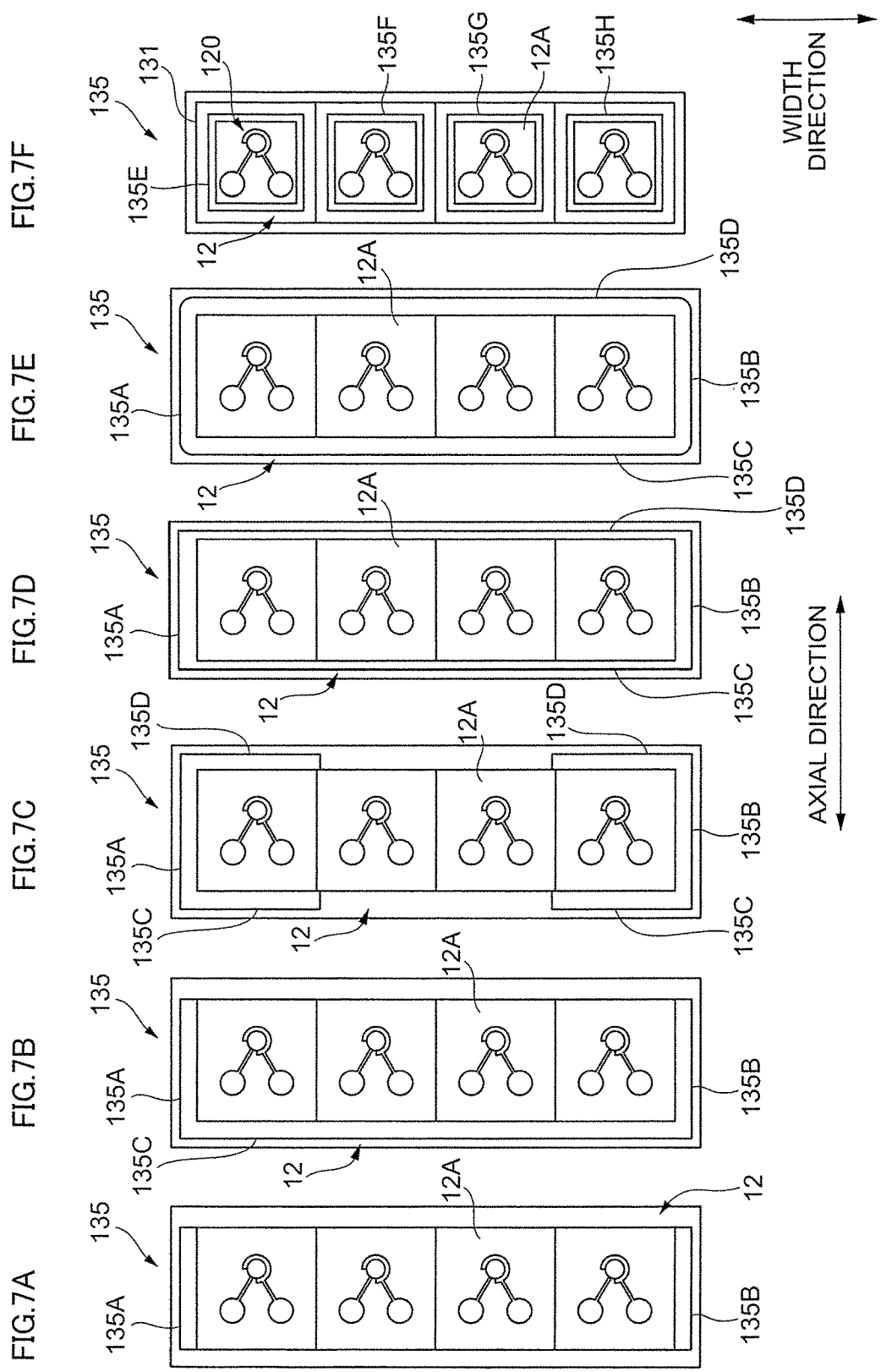

10,613,282 B2

FLUID CONTROL STRUCTURE

BACKGROUND

Technical Field

The present invention relates to a fluid control structure.

Related Art

Recently, various techniques have been known regarding a fluid control structure.

SUMMARY

According to an embodiment of the present invention, there is provided an optical structure. The optical structure includes a substrate, an optical component and an adhesive. The substrate includes a cavity on a first surface of the substrate. The optical component is on the substrate. The adhesive is applied to a side of the optical component to fix the optical component to the substrate. Furthermore, in the optical structure, the optical component includes a recess on a second surface of the optical component, the second surface is opposed to the first surface of the substrate, and the recess is provided along an edge of the second surface.

According to another embodiment of the present invention, there is provided a fluid control structure. The fluid control structure includes a first component, a second component and a fluid. The first component includes a cavity on a first surface of the first component. The second component is on the first component. The fluid infiltrates into a gap between the first component and the second component. Furthermore, in the fluid control structure, the gap includes a narrow area and a wide area, the wide area has a wider width of the gap than the narrow area, and the wide area is adjacent to the narrow area and closer to the cavity than the narrow area.

According to still another embodiment of the present invention, there is provided a method for fabricating an optical structure. The method includes forming a substrate with a cavity on a first surface of the substrate. The method further includes forming an optical component with a recess on a second surface of the optical component. The method further includes mounting the optical component on the substrate. The second surface of the optical component is opposed to the first surface of the substrate. The recess is on a periphery of the second surface with respect to an opposing area. The opposing area is a part of the second surface to be opposed to the cavity. The method further includes applying an adhesive to a side of the optical component so that the adhesive infiltrates into a gap between the substrate and the optical component. The method further includes preventing the adhesive from flowing into the cavity with the recess. The method further includes fixing the optical component to the substrate with the adhesive.

BRIEF DESCRIPTION OF THE DRAWINGS

FIG. 3B depicts a schematic cross-sectional view taken along the line IIIB-IIIB in FIG. 3A.

FIG. 7A, FIG. 7B, FIG. 7C, FIG. 7D, FIG. 7E and FIG. 7F depict bottom views of the VCSEL chip array according to other modifications of the first embodiment.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Figure 1:
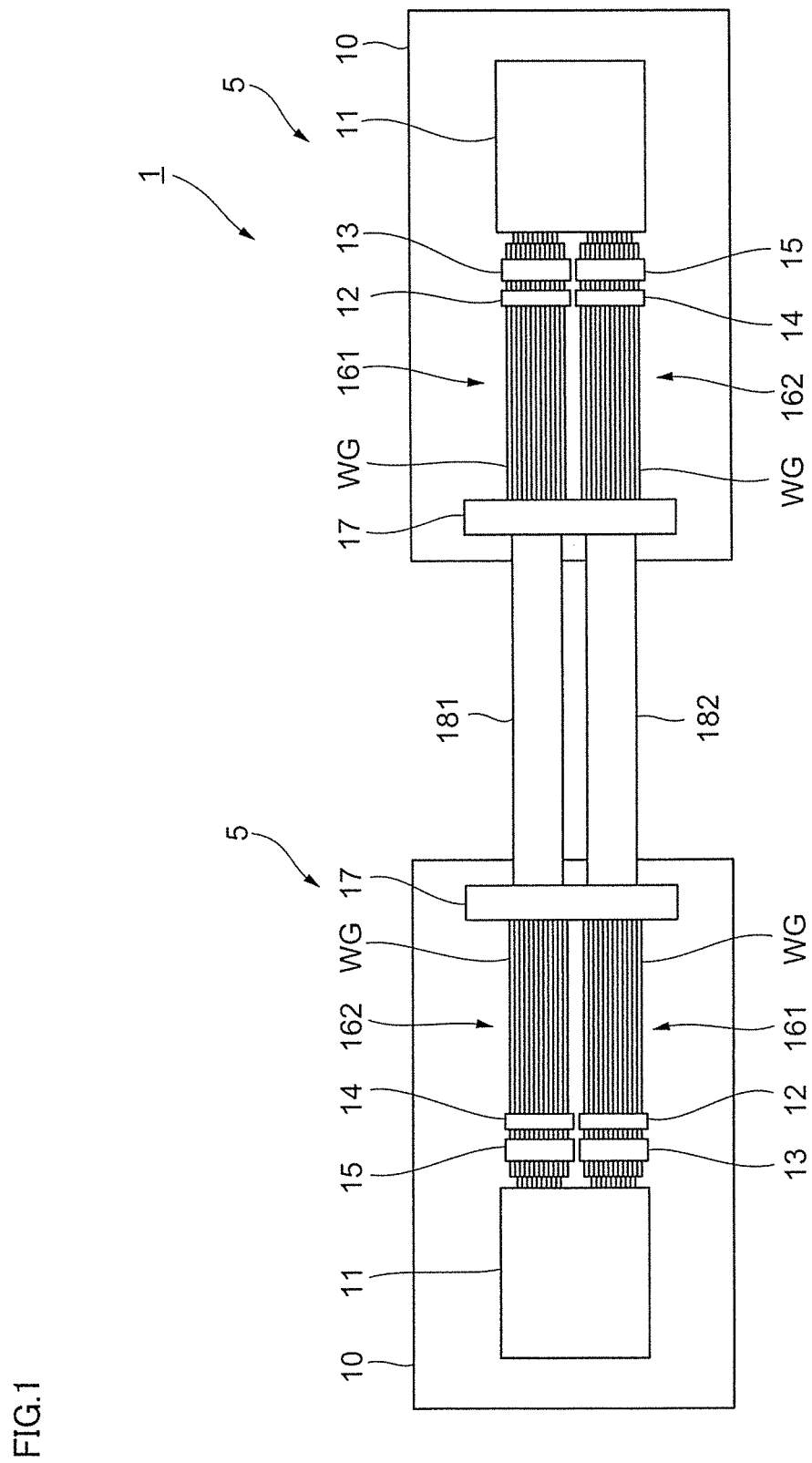
FIG. 1 depicts a top view of an optical communication system according to the first embodiment.

Referring to FIG. 1, there is shown a top view of an optical communication system 1 according to a first embodiment. As shown in FIG. 1, the optical communication system 1 may include two multi-chip modules (MCMs) 5. The multi-chip module (MCM) 5 may include a main substrate 10, a central processing unit (CPU) 11, a vertical cavity surface emitting laser (VCSEL) chip array 12, a laser diode driver (LDD) chip 13, a photodiode (PD) chip array 14, a trans-impedance amplifiers (TIA) chip 15, waveguide layers 161 and 162, and a fiber connector 17. Further, as shown in the figure, the optical communication system 1 may include fiber cables 181 and 182 each having several (e.g., 12 or 24) fiber cable cores.

The waveguide layer 161 may include multiple waveguide cores WG whose number matches the number of cores of the fiber cable 181 or 182. The VCSEL chip array 12 may include multiple VCSEL devices whose number matches the number of cores (not shown) of the waveguide layer 161. The waveguide layer 162 may include multiple waveguide cores WG whose number matches the number of cores (not shown) of the fiber cable 181 or 182. The PD chip array 14 may include multiple PD devices whose number matches the number of cores of the waveguide layer 162. The VCSEL chip array 12 is an example of an optical component or an example of a second component. The waveguide layer 161 is an example of a substrate or an example of a first component. The MCM 5 is an example of an optical multi-chip module.

Figure 2:
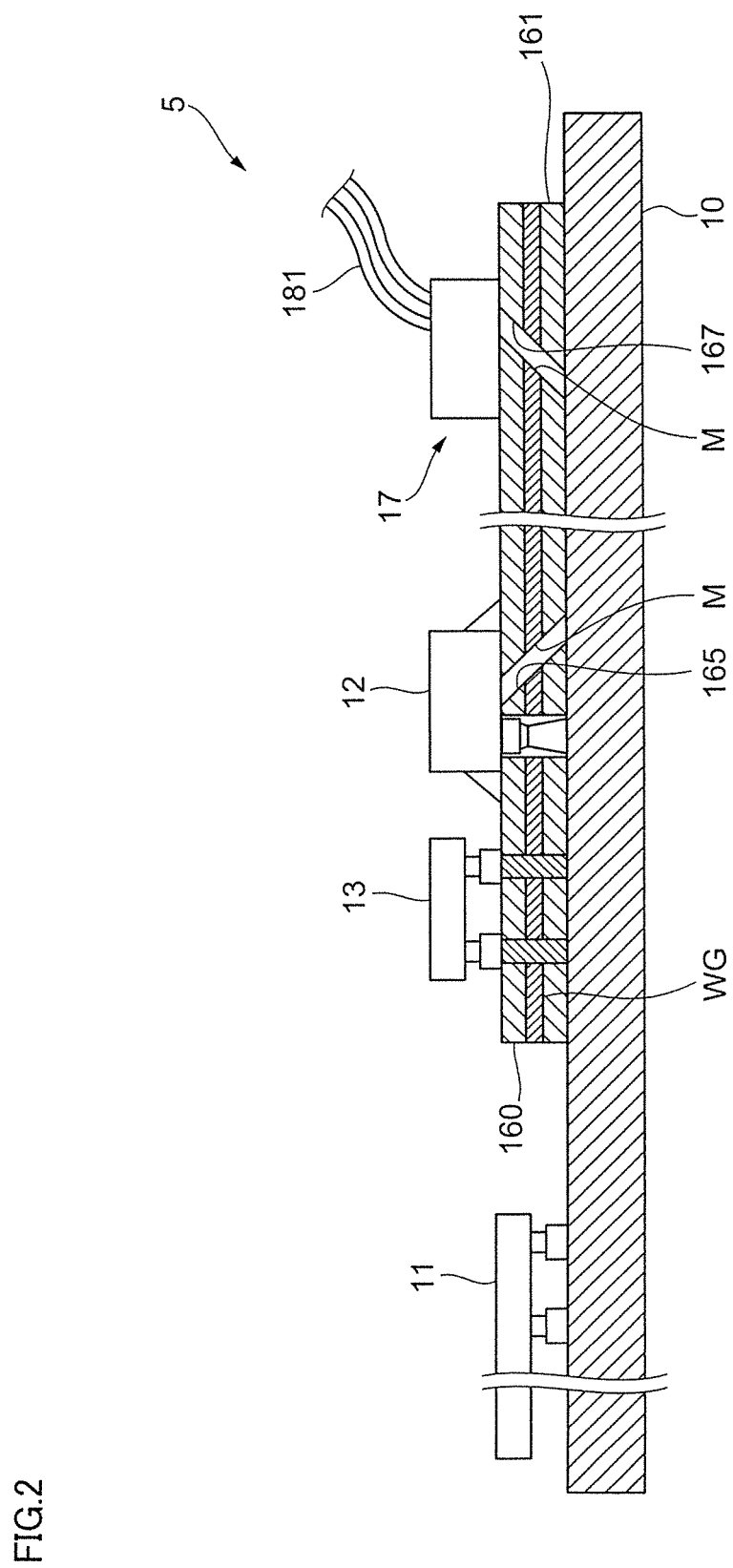
FIG. 2 depicts a side view of a multi-chip module (MCM) according to the first embodiment.

Referring to FIG. 2, there is shown a side view of the MCM 5 according to the first embodiment. As shown in the figure, the waveguide layer 161 may be formed on the surface of the main substrate (e.g., an organic substrate) 10. The waveguide layer 161 may include the waveguide cores WG and a cladding layer 160. The waveguide layer 161 may be formed as a polymer waveguide. Note that the waveguide layer 161 is an optical waveguide-integrated organic structure.

The waveguide layer 161 may be provided with multiple mirror cavities (mirror ablation holes) 165. The mirror cavities 165 are provided at one end of the waveguide cores WG (left side in FIG. 2) and opened to the VCSEL chip array 12. Each mirror cavity 165 is provided on each waveguide core WG. In other words, the number of the mirror cavities 165 matches the number of the waveguide cores WG. The mirror cavity 165 is an example of a cavity. Note that the mirror cavities 165 may be fabricated by laser ablation instead of dicing blade for high channel density.

The waveguide layer 161 may also be provided with multiple mirror cavities 167. The mirror cavities 167 are provided at the other end of the waveguide cores WG (right side in FIG. 2) and opened to the fiber connector 17. Each mirror cavity 167 is provided on each waveguide core WG. In other words, the number of the mirror cavities 167 matches the number of the waveguide cores WG.

The mirror cavities 165 and 167 may be inclined at an angle of 45° to form reflective surfaces (mirrors M) on boundaries (interfaces) between the waveguide cores WG and the mirror cavities 165 or the mirror cavities 167. In the embodiment, the boundaries may be provided without a metal coating, and the mirror cavities 165 and 167 may be filled with air (atmosphere, gas). This configuration enables the mirrors M to reflect the light by total internal reflection (TIR). More specifically, the mirrors M of the mirror cavities 165 reflect the light from the VCSEL chip array 12 to the waveguide cores WG by total internal reflection. The mirrors M of the mirror cavities 167 reflect the light from the waveguide cores WG to the fiber connector 17 by total internal reflection.

Figure 3A:
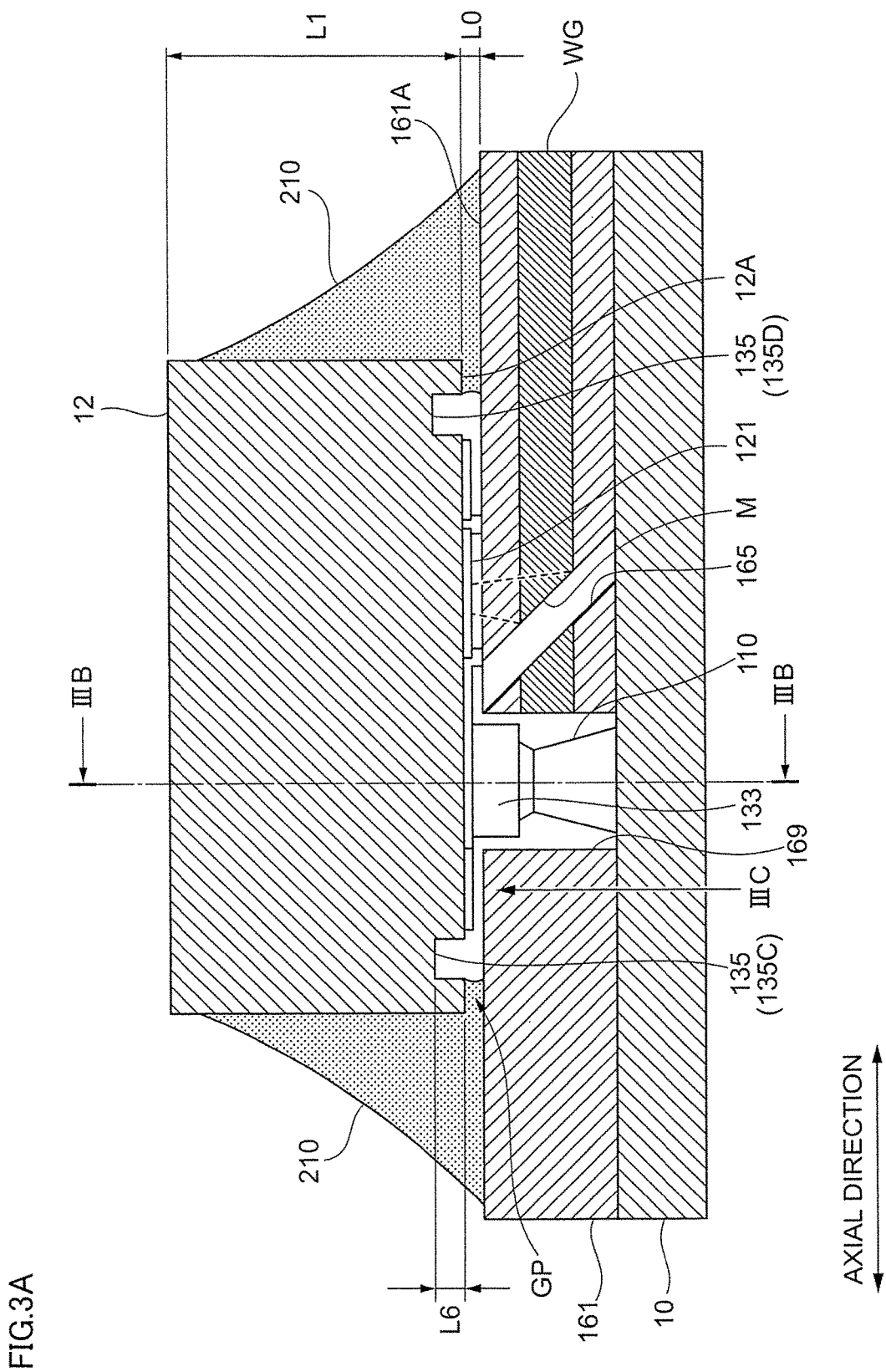
FIG. 3A depicts a schematic cross-sectional view of a vertical cavity surface emitting laser (VCSEL) chip array and a waveguide layer according to the first embodiment, taken along the line IIIA-IIIA in FIG. 3C.
Figure 3C:
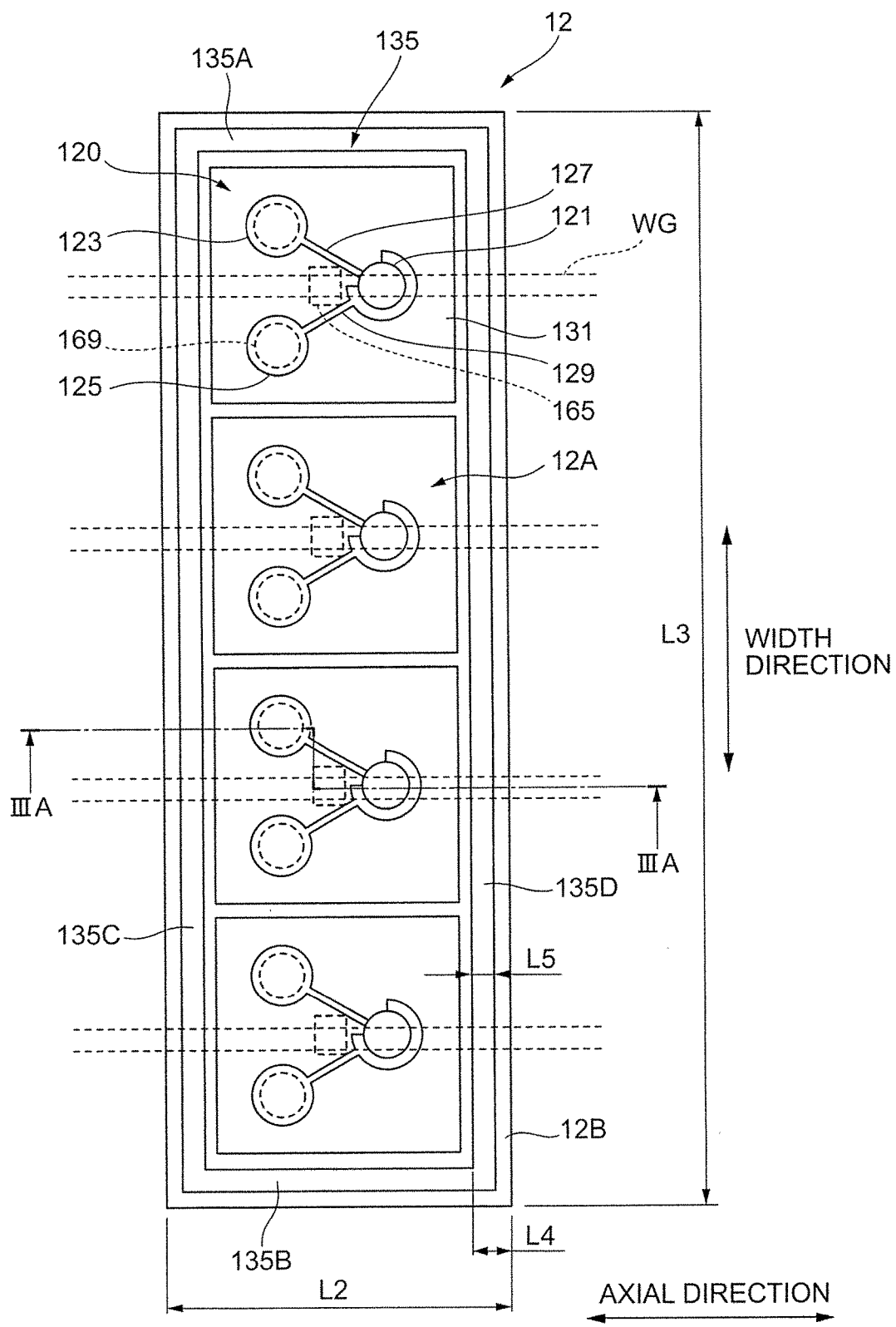
FIG. 3C depicts a bottom view of the VCSEL chip array viewed along the arrow IIIC in FIG. 3A.
Figure 3D:
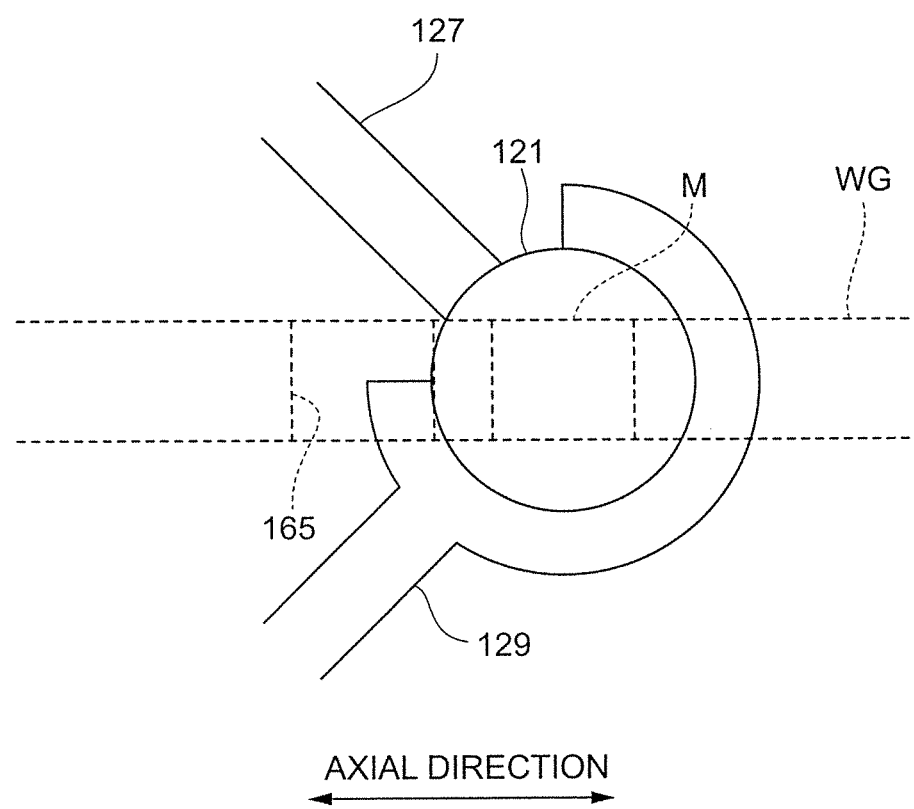
FIG. 3D depicts an enlarged bottom view of the VCSEL chip array around an emitting area.

FIG. 3A depicts a schematic cross-sectional view of the VCSEL chip array 12 and the waveguide layer 161 according to the first embodiment, taken along the line IIIA-IIIA in FIG. 3C. FIG. 3B depicts a schematic cross-sectional view taken along the line IIIB-IIIB in FIG. 3A. FIG. 3C depicts a bottom view of the VCSEL chip array 12 viewed along the arrow IIIC in FIG. 3A. FIG. 3D depicts an enlarged bottom view of the VCSEL chip array 12 around an emitting area 121.

In the following explanation, the direction along the axis of the waveguide core WG is called an axial direction, and the direction perpendicular to the axis of the waveguide core WG is called a width direction.

Referring FIGS. 3A to 3D, an explanation is given about the configuration around the VCSEL chip array 12 according to the first embodiment. As shown in FIG. 3A, the VCSEL chip array 12 is provided on the waveguide layer 161.

As shown in FIGS. 3A to 3C, the VCSEL chip array 12 has a generally rectangular parallelepiped shape. The VCSEL chip array 12 has a bottom surface 12A. The VCSEL chip array 12 may include, on the bottom surface 12A, emitting areas 121, electrodes 123, 125, connecting areas 127, 129, insulating areas 131, studs 133, and a groove 135. The bottom surface 12A is an example of a second surface of the optical component.

The emitting areas 121 are areas emitting the light. The emitting areas 121 are arranged in a row corresponding to the row of the mirrors M of the mirror cavities 165 (refer to FIGS. 3C and 3D). The VCSEL chip array 12 is positioned on the waveguide layer 161 so that each emitting area 121 is aligned with the corresponding mirror M provided on the waveguide core WG. This configuration allows the light emitted from the emitting area 121 to be reflected at the mirror M. The light reflected at the mirror M passes through the waveguide core WG. In the shown example, the emitting area 121 has a generally round shape in a plane view.

The electrodes 123 are electrically connected with the respective emitting areas 121 via the connecting areas 127. The electrodes 125 are also electrically connected with the respective emitting areas 121 via the connecting areas 129. The electrodes 123, 125 are arranged in a row along the row of the mirrors M. In the shown example, the electrodes 123, 125 have a generally round shape in a plane view. In the following explanation, a set of the emitting area 121, the electrodes 123, 125 and the connecting areas 127, 129 may be called an emitting circuit 120.

As shown in FIG. 3C, the insulating areas 131 are provided on a central area of the bottom surface 12A. The insulating areas 131 are arranged in a row along the longitudinal direction of the VCSEL chip array 12. Each insulating area 131 has a generally square shape in a plane view. The insulating area 131 surrounds an area where the emitting circuit 120 is provided. The insulating area 131 may be a resin, such as polyimide.

The studs 133 are respectively provided on the electrodes 123, 125. The studs 133 are electrical contact points for connection between the electrodes 123, 125 and the main substrate 10. The studs 133 may be a metal, such as Au. Each stud 133 is a protruded portion on the bottom surface 12A. More specifically, the stud 133 is the most protruded portion of the he VCSEL chip array 12 toward the main substrate 10. The stud 133 is an example of a protrusion on the second surface.

The groove 135 is a recessed portion on the bottom surface 12A. The detailed configuration of the groove 135 will be described later.

The waveguide layer 161 has an upper surface 161A. The waveguide layer 161 may include the mirror cavities 165 on the upper surface 161A. The upper surface 161A is an example of a first surface of the substrate. The waveguide layer 161 may also include through holes (holes) 169 penetrating the waveguide layer 161. Each through hole (hole) 169 is provided on a position corresponding to the stud 133 provided on the electrodes 123, 125. The inner space of the through hole 169 is larger than the stud 133. This configuration enables at least a part of the stud 133 to be disposed in the corresponding through hole 169. In the shown example, the through hole 169 has a generally round shape in a plane view.

As shown in FIGS. 3A and 3B, the VCSEL chip array 12 is glued onto the waveguide layer 161 using an adhesive 210. The adhesive 210 may be a photocurable material, such as ultraviolet (UV) curing resin or a thermal curing material. The adhesive 210 is an example of a fluid.

The VCSEL chip array 12 is provided on the waveguide layer 161 with the stud 133 in the through hole 169. In other words, the stud 133 is positioned inside the waveguide layer 161. That is to say, a protruded part of the VCSEL chip array 12 is inserted in the through hole 169.

The stud 133 is fixed with solder 110 within the through hole 169. This configuration enables the emitting circuit 120 (the VCSEL chip array 12) to be electrically connected with the main substrate 10. Note that a joint between the stud 133 and the solder 110 (the main substrate 10) may be brittle depending on the bonding strength of solder bonding.

To arrange the joint between the stud 133 and the solder 110 in the through hole 169 can shorten a gap GP between the bottom surface 12A of the VCSEL chip array 12 and the upper surface 161A of the waveguide layer 161. Since the light from the emitting areas 121 passes through the gap GP, to shorten the gap GP can decrease an optical loss of the light during passing through the gap GP.

The gap GP between the bottom surface 12A and the upper surface 161A, more specifically the gap GP between the bottom surface 12A on an edge portion of the VCSEL chip array 12 and the upper surface 161A of the waveguide layer 161, as denoted by L0 in FIG. 3A, may be less than 20 μm, preferably less than 10 μm, and more preferably less than 5 μm. Further, the gap GP may be 0 μm. In other words, the VCSEL chip array 12 may contact the upper surface 161A.

Here, in the manufacturing process of the optical communication system 1 (refer to FIG. 1), the VCSEL chip array 12, the waveguide layer 161 and the main substrate 10 may be heated, e.g. in a reflow process or in a soldering process. Due to coefficient of thermal expansion (CTE) mismatch between the VCSEL chip array 12 and the main substrate 10 (the waveguide layer 161), the joint between the stud 133 and the solder 110 may be broken under high temperature condition. The damage of the joint between the stud 133 and the solder 110 may be more severe on both sides of the VCSEL chip array 12 in the longitudinal direction than a central area of the VCSEL chip array 12.

As mentioned above, the VCSEL chip array 12 is glued onto the waveguide layer 161 using the adhesive 210. The adhesive 210 suppresses a change of a relative position between the VCSEL chip array 12 and the waveguide layer 161, so that the adhesive 210 decreases stress on the joint between the stud 133 and the solder 110.

The adhesive 210 is provided on the periphery of the VCSEL chip array 12. In other words, the adhesive 210 is applied as a sidefill structure (sidefill sealing). Sealing by sidefill refers to the adhesive 210 being applied to at least a side (periphery) of the first electrical component (e.g. the VCSEL chip array 12) mounted on the second electrical component (e.g. the waveguide layer 161). In the sealing by sidefill, the adhesive 210 may not be applied to a central portion of an opposing area of the VCSEL chip array 12 and the waveguide layer 161 in a plane view. In other words, the adhesive 210 does not get to the central portion of the opposing area (under the VCSEL chip array 12).

FIGS. 4A to 4D depict a fixing process of the VCSEL chip array 12 to the waveguide layer 161.

Referring FIGS. 4A to 4D, an explanation is given about the general method for fixing the VCSEL chip array 12 to the waveguide layer 161 in the first embodiment.

Figure 4A:
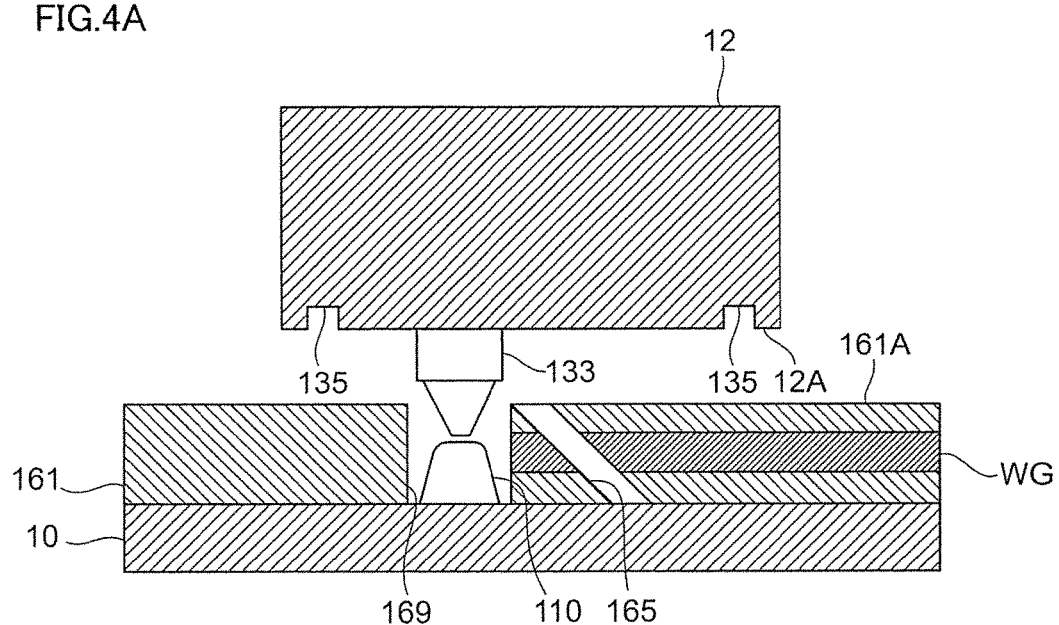
FIG. 4A, FIG. 4B, FIG. 4C and FIG. 4D depict a fixing process of the VCSEL chip array to the waveguide layer.

As shown in FIG. 4A, the VCSEL chip array 12 is first mounted on the waveguide layer 161. The stud 133 of the VCSEL chip array 12 is inserted in the through hole 169 of the waveguide layer 161 to be bonded to the main substrate 10 with the solder 110.

Figure 4B:
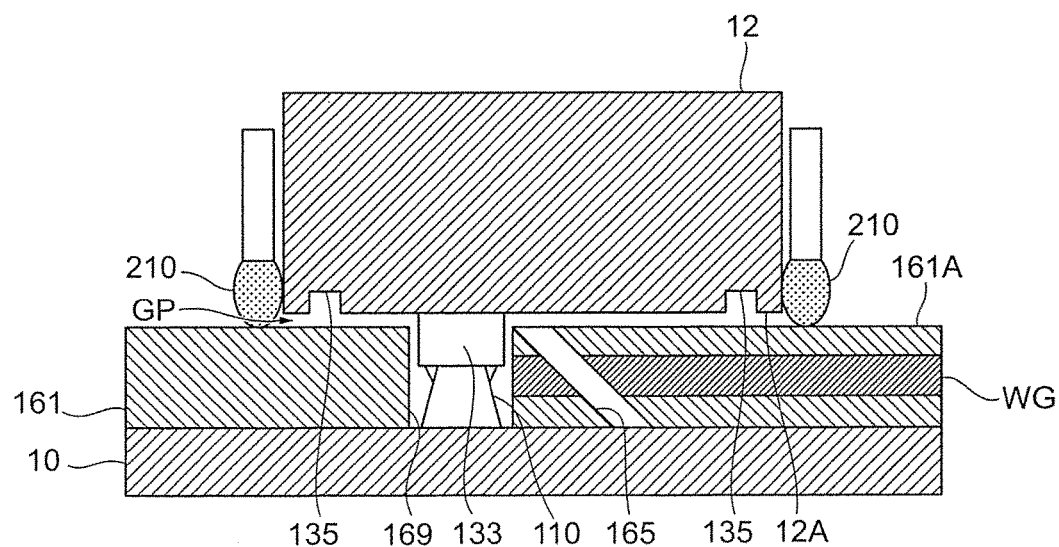

As shown in FIG. 4B, the adhesive 210 in a fluidized state is applied (injected) around the VCSEL chip array 12.

Figure 4C:
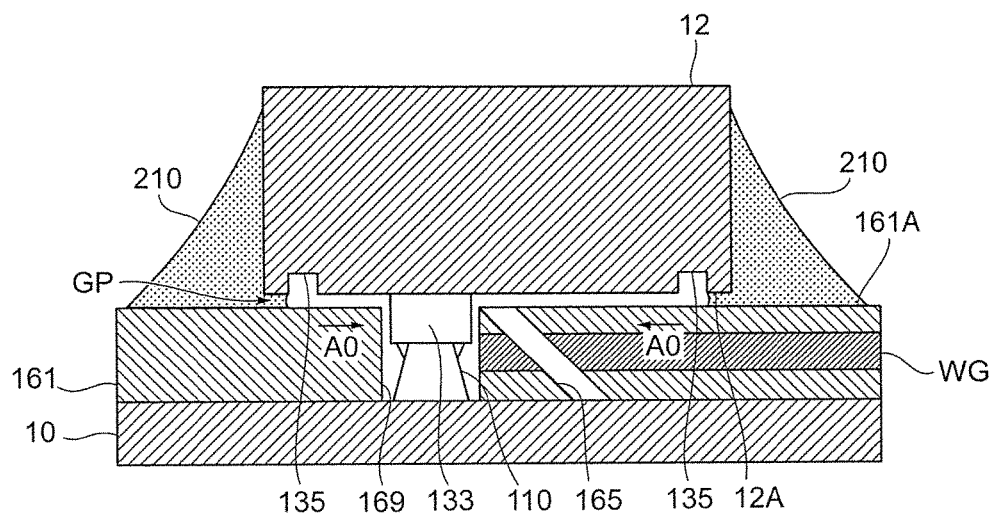

As shown in FIG. 4C, a part of the adhesive 210 distributes through the gap GP due to capillary effect (refer to arrows A0).

Figure 4D:
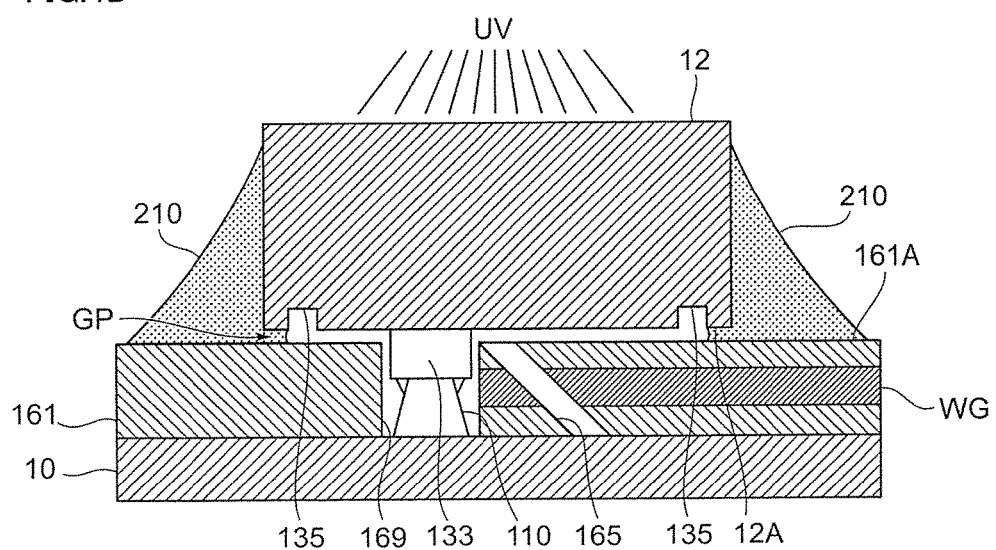

As shown in FIG. 4D, curing light is applied to cure the adhesive 210. This enables to fix the VCSEL chip array 12 to the waveguide layer 161. Instead of the photocurable material, the adhesive 210 may be a thermally cured sidefill adhesive.

In the above mentioned process, the adhesive 210, i.e. viscous sidefill material, is solidified on the whole periphery of the VCSEL chip array 12 except the center of the bottom surface 12A.

Returning to FIGS. 3A, 3B and 3C, an explanation is given about the groove 135 according to the first embodiment. As shown in FIG. 3C, the groove 135 is provided on the bottom surface 12A along the edges of the VCSEL chip array 12. In other words, the groove 135 is provided on the outer periphery of the bottom surface 12A (in proximity to the edges of the VCSEL chip array 12). The groove 135 is an example of a recess. The groove 135 is an example of a wide area. The outer periphery of the groove 135 is an example of a narrow area.

The groove 135 may be fabricated by laser ablation or reactive ion etching (RIE) in the manufacturing process of the VCSEL chip array 12.

The groove 135 controls a flow of the adhesive 210 in the fluidized state. More specifically, the groove 135 controls a capillary phenomenon of the adhesive 210. The groove 135 prevents the adhesive 210 from flowing into the mirror cavities 165 by enlarging the height of the gap GP.

Control the flow of the adhesive 210 may influence a yield in the manufacturing process of the optical communication system 1 (refer to FIG. 1). Thus, use of the groove 135 enables improvement of an assembly yield of the VCSEL chip array 12.

Here, if the distributing adhesive 210 flows (infiltrates) into the mirror cavities 165, the mirror cavities 165 may not function as the mirrors M reflecting the light by total internal reflection. In other words, the reflectivity at the mirrors M may be declined.

Further, if sealing by underfill is applied instead of the sealing by sidefill, the adhesive 210 may get to the central portion of the opposing area. That is to say, the sealing by underfill may result in the above undesired flow of the adhesive 210 into the mirror cavities 165. Note that the sealing by sidefill according to the first embodiment needs a small amount of the adhesive 210 compared to the sealing by underfill.

The groove 135 is provided on the bottom surface 12A so as to surround an area where the mirror cavities 165 are provided, more specifically where the mirror cavities 165, the through holes 169, and the emitting areas 121 are provided.

This configuration enables prevention of the adhesive 210 from flowing into the through holes 169. Note that since the through holes 169 and the mirror cavities 165 are provided adjacent to each other, the flow of the adhesive 210 into the through holes 169 may result in the adhesive flowing into the mirror cavities 165. In other words, prevention of the adhesive 210 from flowing into the through holes 169 may contribute to the prevention of the adhesive 210 from flowing into the mirror cavities 165.

The above mentioned configuration also enables prevention of the adhesive 210 from flowing into the light path of the light from the emitting areas 121. In other words, the light from the emitting areas 121 does not traverse the adhesive 210. This configuration reduces optical loss by the light traversing the adhesive 210. This configuration also increases options of a material for the adhesive 210 since the adhesive 210 is not required to be transparent to the light from the emitting areas 121.

As shown if FIG. 3C, the groove 135 may include multiple liner groove portions, i.e. the first portion 135A, the second portion 135B, the third portion 135C and the fourth portion 135D. The first portion 135A to the fourth portion 135D are provided along the respective edges of the VCSEL chip array 12. The first portion 135A and the second portion 135B are provided on both sides along the axial direction.

The third portion 135C and the fourth portion 135D are provided on both sides along the width direction.

In one example, the height of the VCSEL chip array 12 (refer to L1 in FIG. 3A) may be 150 μm, the length of the VCSEL chip array 12 (refer to L2 in FIG. 3C) may be 300 μm, and the width of the VCSEL chip array 12 (refer to L3 in FIG. 3C) may be 1 mm. In this example, the bottom surface 12A has a fringe area 12B which is not covered by the insulating areas 131. The width of the fringe area 12B (refer to L4 in FIG. 3C) may be equal to or more than 30 μm.

The groove 135 is provided in the fringe area 12B. The width of the groove 135 (refer to L5 in FIG. 3C) may be 5 μm to 100 μm, preferably 10 μm to 50 μm. Note that the small width of the groove 135 can reduce the size of the VCSEL chip array 12. The depth of the groove 135 (refer to L6 in FIG. 3A) may be 10 μm to 100 μm, preferably 20 μm to 50 μm. Note that the depth of the groove 135 is larger than the height of the gap GP (refer to L0 in FIG. 3A), and preferably twice as much or more than the height of the gap GP.

The groove 135 enlarges the height (size) of the gap GP such that the size of the gap GP increases abruptly in the groove 135. In the shown example, the cross-sectional shape of the groove 135 is rectangular (refer to FIG. 3A).

Figure 5A:
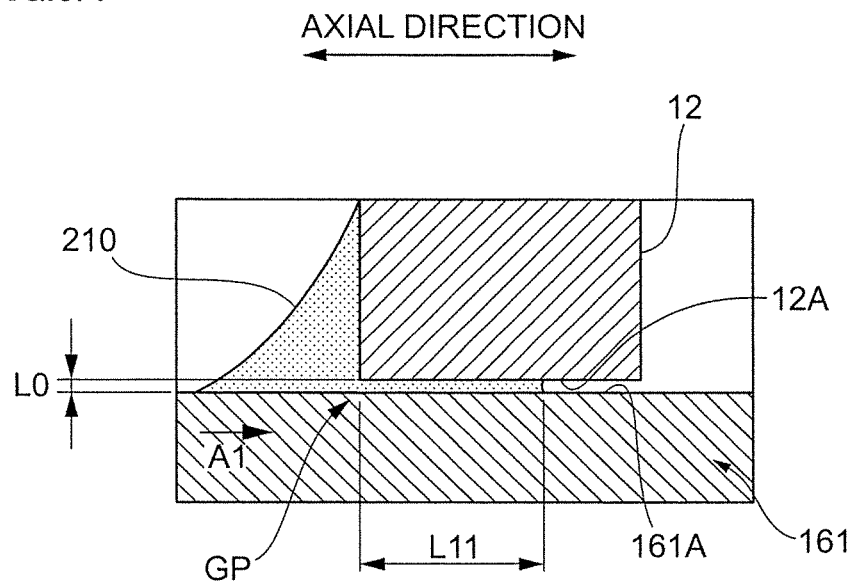
FIG. 5A depicts a simulation result of the flow of the adhesive without a groove according to a comparative example.

FIG. 5A depicts a simulation result of the flow of the adhesive 210 without the groove 135 according to a comparative example. FIGS. 5B to 5E respectively depict simulation results of the flow of the adhesive 210 with the groove 135 according to the first embodiment.

An explanation is given about the simulation of fluid dynamics of the adhesive 210 in the gap GP. The simulation of fluid dynamics is conducted in a two dimensional flow.

As shown in FIG. 5A, the general configuration for the simulation includes the VCSEL chip array 12 and the waveguide layer 161. The VCSEL chip array 12 and the waveguide layer 161 are provided in the atmosphere. In the initial state, the adhesive 210 in a fluidized state is enclosed in fields on a side (left side in FIG. 2) of the VCSEL chip array 12.

The properties of the adhesive 210 in a fluidized state are as follows: the surface tension is 0.03 kg/s$^2$, the kinetic viscosity is 0.1 m$^2$/s, the contact angle is 24 degrees. The gap GP (refer to L0 in FIGS. 5A and 5B) is 1 μm in FIGS. 5A and 5B, 5 μm in FIG. 5C, 10 μm in FIG. 5D, and 20 μm in FIG. 5E. The simulation duration is 90 s.

Figure 5B:
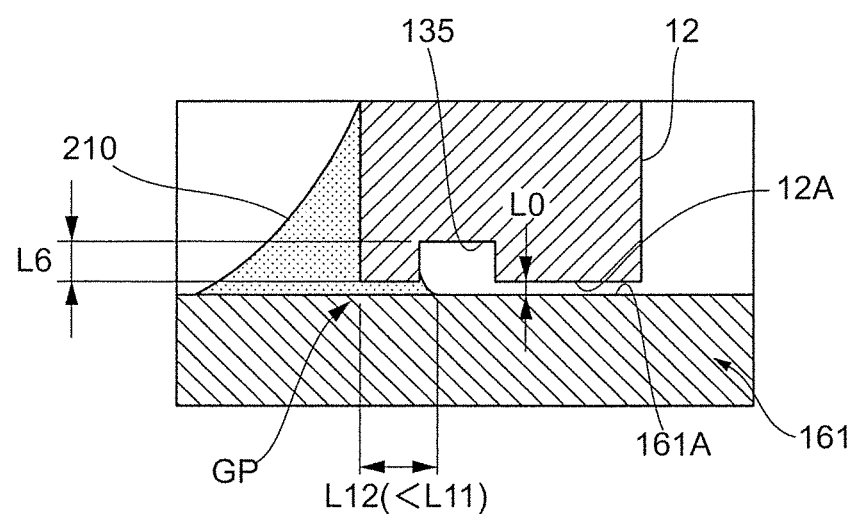
FIG. 5B, FIG. 5C, FIG. 5D and FIG. 5E depict simulation results of the flow of the adhesive with the groove according to the first embodiment.

As shown in FIG. 5A, the simulation results without the groove 135 indicate that the adhesive 210 infiltrates (flows) into the gap GP (refer to the arrow A1). The infiltrating length in the axial direction is indicated by L11. On the other hand, as shown in FIG. 5B, the simulation results with the groove 135 indicate less infiltration of the adhesive 210 as indicated by the infiltrating length L12, which is shorter than the infiltrating length L11 in FIG. 5A. Further, the adhesive 210 stops at the groove 135 (in front of the groove 135). According to this simulation, providing the groove 135 on the VCSEL chip array 12 may control the flow of the adhesive 210. In other words, the groove 135 suppresses the volume of the adhesive 210 infiltrating into the gap GP.

Figure 5C:
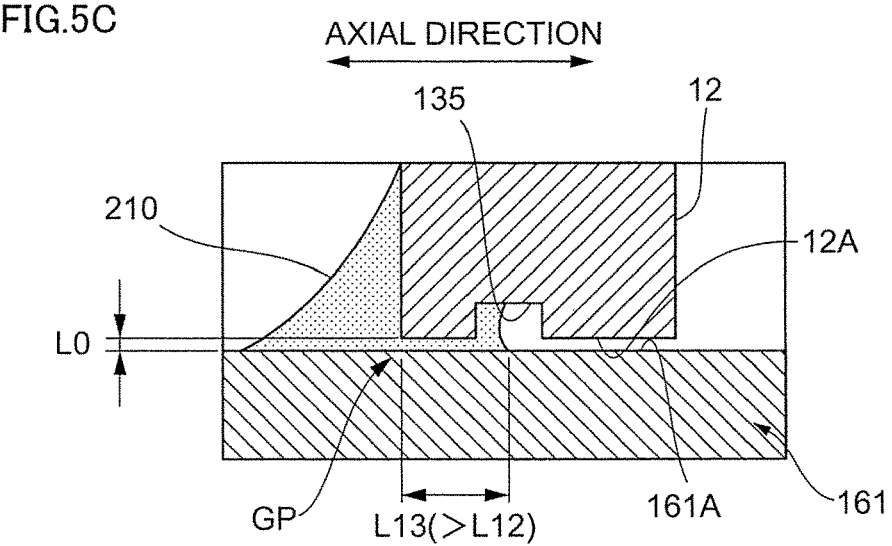
Figure 5D:
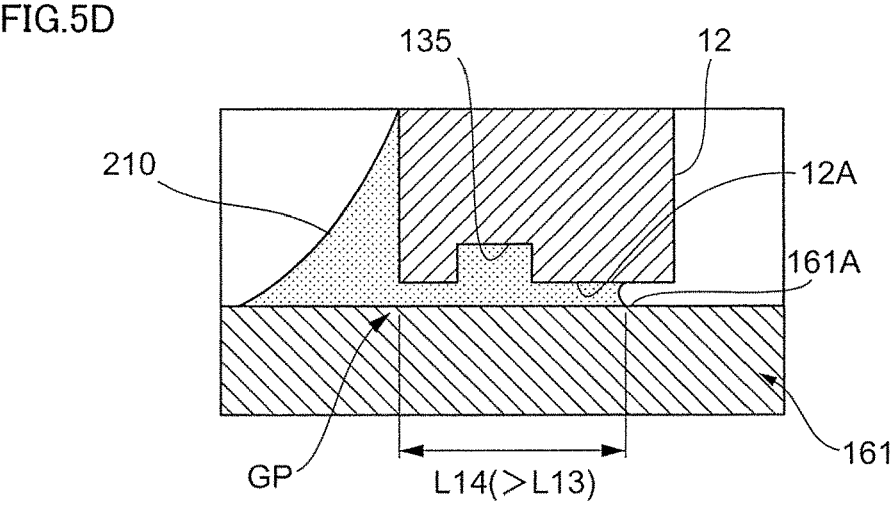
Figure 5E:
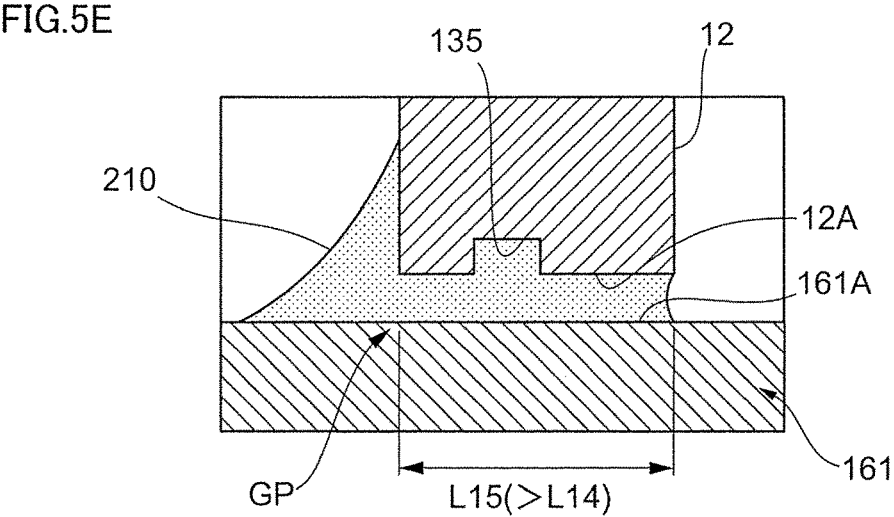

As shown in FIGS. 5B to 5E, the infiltrating length L12 in FIG. 5B, the infiltrating length L13 in FIG. 5C, the infiltrating length L14 in FIG. 5D, and the infiltrating length L15 in FIG. 5E become longer in this order. According to this simulation, adjusting the size of the gap GP may control the flow of the adhesive 210. For example, the simulation results indicate that a smaller gap GP equates with a shorter infiltrating length. Further, the adhesive 210 may be stopped by the groove 135 more effectively if the height of the gap GP is equal to or less than 5 μm.

FIGS. 6A to 6E respectively depict cross-sectional views of the VCSEL chip array 12 and the waveguide layer 161 according to other modifications of the first embodiment.

Figure 6A:
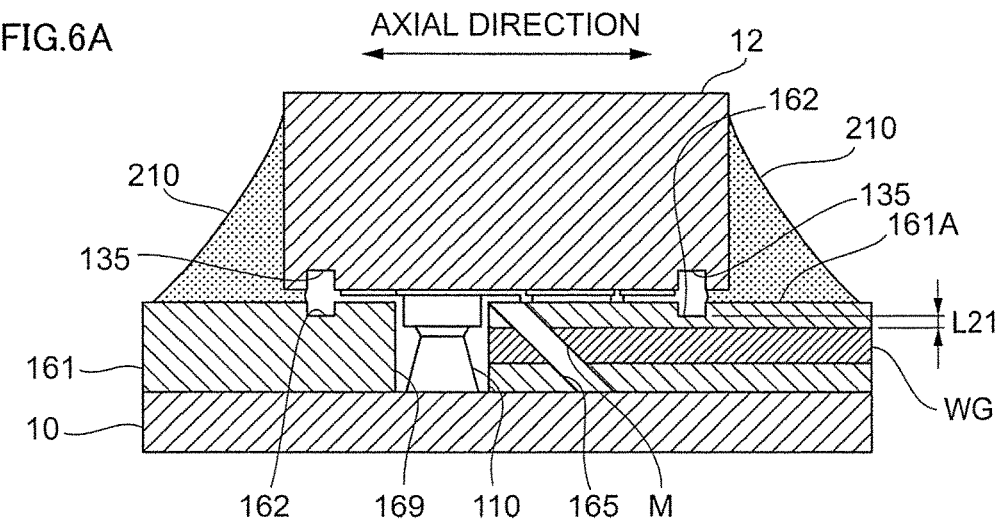
FIG. 6A, FIG. 6B, FIG. 6C, FIG. 6D and FIG. 6E depict cross-sectional views of the VCSEL chip array and the waveguide layer according to other modifications of the first embodiment.

As shown in FIG. 6A, the waveguide layer 161 may include a groove 162 on the upper surface 161A. The groove 162 may be provided along the edges of the VCSEL chip array 12. In other words, the groove 162 is opposed to the groove 135 of the VCSEL chip array 12, and may have a corresponding shape to the groove 135. The combination of the groove 162 and the groove 135 suppresses the flow of the adhesive 210 more effectively.

In this modification, the thickness from the bottom of the groove 162 to the waveguide core WG (refer to L21 in FIG. 6A) may be equal to or more than 10 μm to prevent the light from running out from the waveguide core WG. Note that the groove 162 of the waveguide layer 161 may be provided instead of the groove 135 of the VCSEL chip array 12. In other words, the groove 135 can be replaced with the groove 162 of the waveguide layer 161.

Figure 6B:
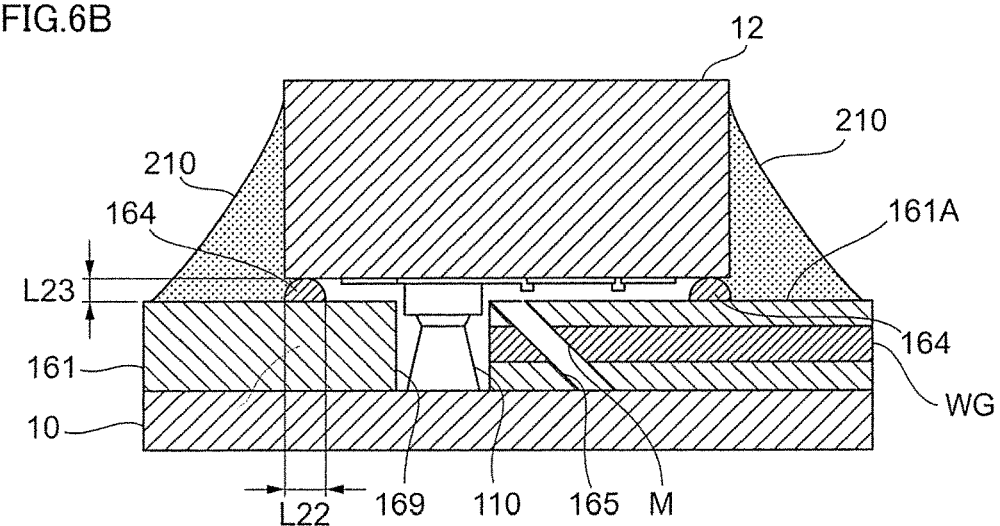

As shown in FIG. 6B, the waveguide layer 161 may include a bank 164 instead of the groove 135 of the VCSEL chip array 12. The bank 164 may be provided along the edges of the VCSEL chip array 12. The bank 164 suppresses the flow of the adhesive 210. A material of the bank 164 may be dispensed and cured. For example, the bank 164 may be provided by silk screen with a polymeric material. In this modification, the bank 164 has a hemisphere shape. In other words, the top surface of the bank 164 has a curved surface and protrudes towards the VCSEL chip array 12. The diameter of the bank 164 (refer to L22 in FIG. 6B) may be approximately 30 μm, and the height of the bank 164 (refer to L23 in FIG. 6B) may be approximately 20 μm.

Figure 6C:
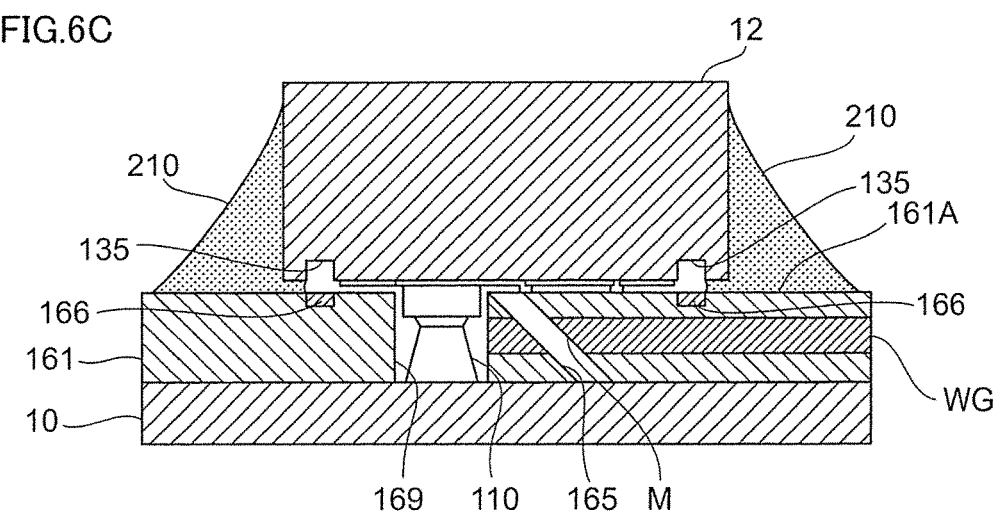

As shown in FIG. 6C, the waveguide layer 161 may include a hydrophobic area 166 on the upper surface 161A. The hydrophobic area 166 is a treated surface having poorer wettability to a liquid adhesive than other areas surrounding the treated surface. The hydrophobic area 166 is provided along the edges of the VCSEL chip array 12. In other words, the hydrophobic area 166 is opposed to the groove 135 of the VCSEL chip array 12. The hydrophobic area 166 suppresses the flow of the adhesive 210 with the groove 135.

Figure 6D:
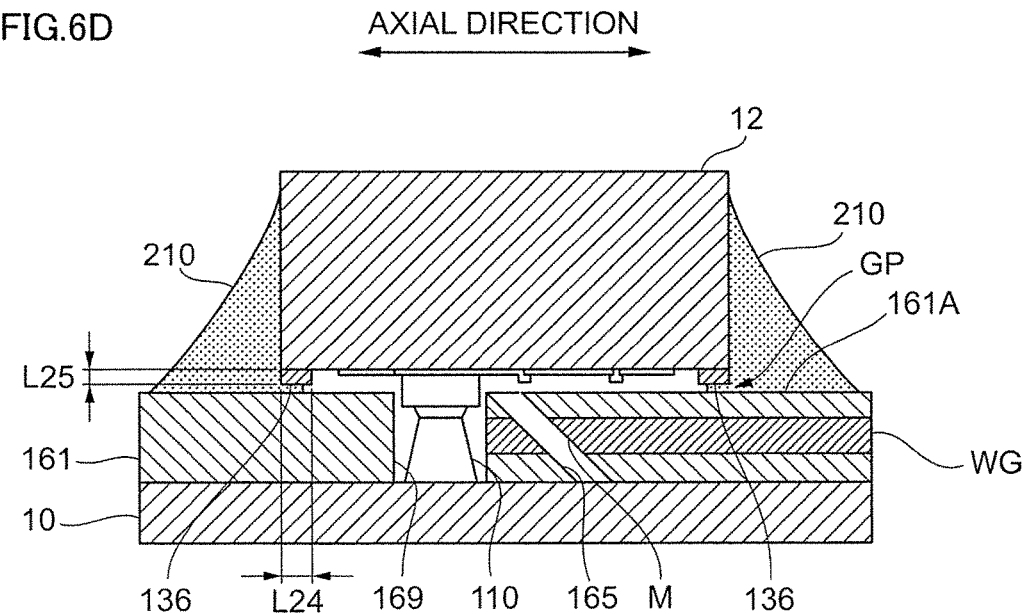

As shown in FIG. 6D, the VCSEL chip array 12 may include a bank 136 instead of the groove 135 (refer to FIG. 3A). In other words, the groove 135 can be replaced with the bank 136 on the VCSEL chip array 12. The bank 136 suppresses the flow of the adhesive 210. The bank 136 may be provided in the manufacturing of the VCSEL chip array 12 with a metal material or an insulation material. For example, the bank 136 may be provided by lithography process in the manufacturing of the VCSEL chip array 12. The width of the bank 136 (refer to L24 in FIG. 6D) may be equal to or more than 10 μm, and the height of the bank 136 (refer to L25 in FIG. 6D) may be equal to or more than 10 μm.

Figure 6E:
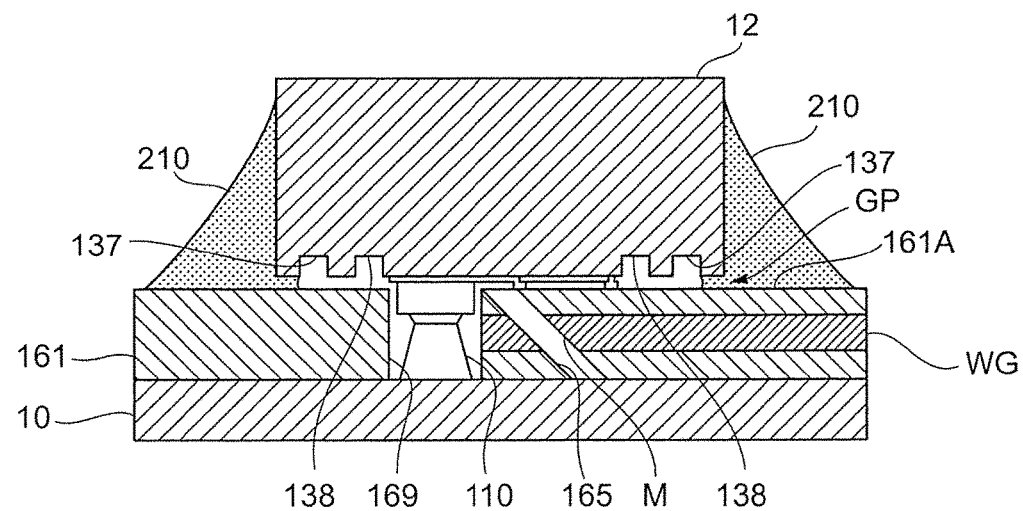

As shown in FIG. 6E, the VCSEL chip array 12 may include multiple grooves, i.e. an outer groove 137 and an inner groove 138. The outer groove 137 is provided along the edges of the VCSEL chip array 12, and the inner groove 138 is provided inside of and along the outer groove 137. In this modification, use of the two grooves 137, 138 prevents the adhesive from infiltrating into the mirror cavities 165 effectively.

FIGS. 7A to 7F respectively depict bottom views of the VCSEL chip array 12 according to other modifications of the first embodiment. The shape of the groove 135 provided on the VCSEL chip array 12 may not be limited to the shape as shown in FIG. 3C.

As shown in FIGS. 7A to 7C, the groove 135 may have a discontinuous area. In other words, the shape of the groove 135 is not limited to one that completely surrounds the central area of the bottom surface 12A. As shown in FIG. 7A, the groove 135 may include the first portion 135A and the second portion 135B, eliminating the third portion 135C and the fourth portion 135D (refer to FIG. 3C). In other words, the groove 135 shown in FIG. 7A is provided on both sides along the axial direction. As shown in FIG. 7B, the groove 135 may include the first portion 135A, the second portion 135B, and the third portion 135C, eliminating the fourth portion 135D (refer to FIG. 3C). As shown in FIG. 7C, the groove 135 may include the first portion 135A to the fourth portion 135D with the third portion 135C and the fourth portion 135D each including a discontinuous part.

As shown in FIG. 7D, the groove 135 may have an uneven width. For example, the width of the first portion 135A and the second portion 135B may be wider than the width of the third portion 135C and the fourth portion 135D.

As shown in FIG. 7E, the groove 135 may include a curved portion. For example, the groove 135 shown in FIG. 7E has a generally rectangle shape with rounded corners.

As shown in FIG. 7F, the groove 135 may be provided on each insulating area 131 instead of the fringe area 12B (refer to FIG. 3C). For example, grooves 135E to 135H may be provided on a periphery of the respective emitting circuits 120.

Here, the cross-sectional shape of the groove 135 may not be limited to the rectangular shape as shown in FIG. 3A as long as the groove 135 enlarges the height of the gap GP. The cross-sectional shape of the groove 135 may be a trapezoid shape, a curved shape, or a V-shape. The groove 135 may be provided with an uneven bottom.

Figure 8:
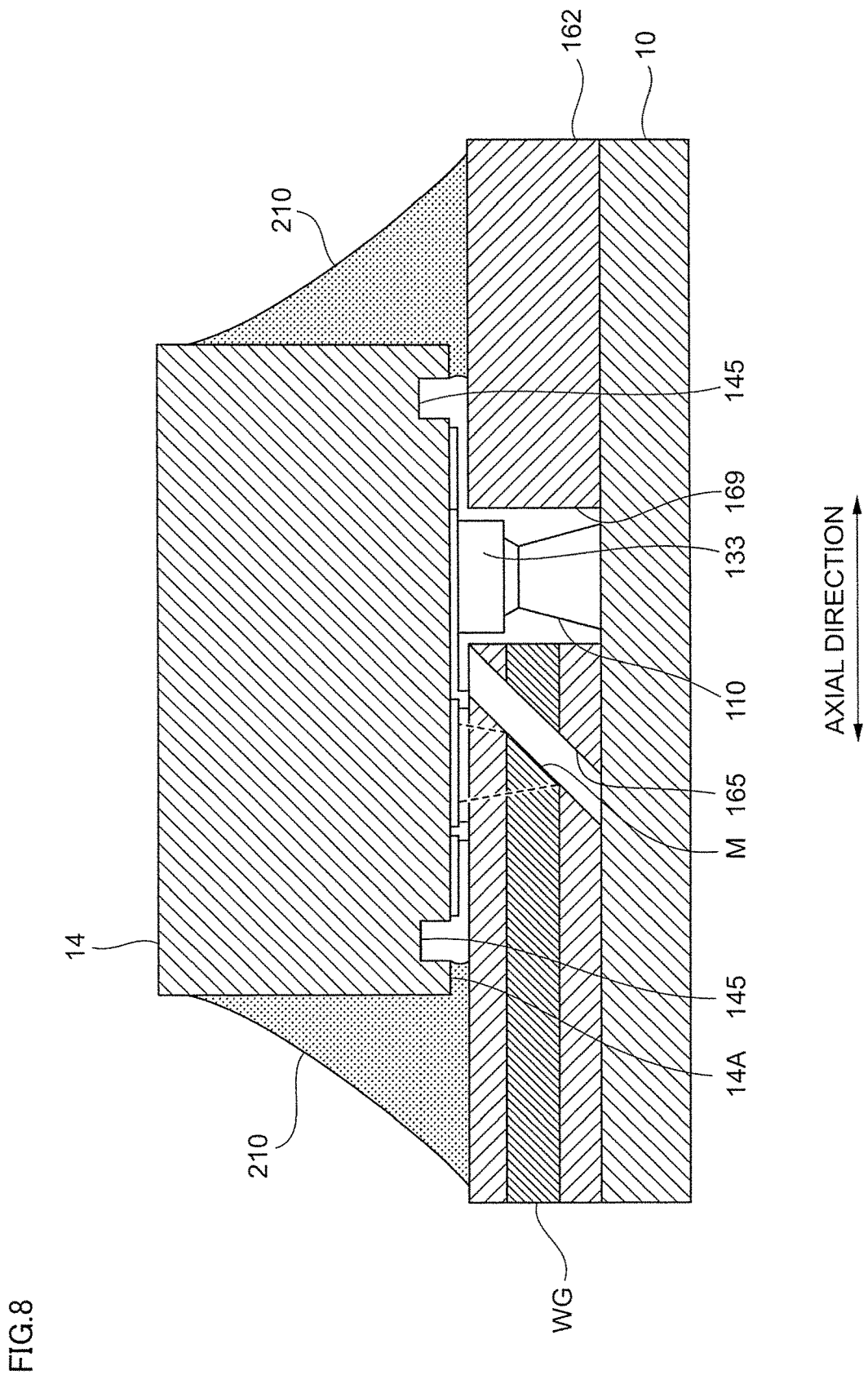
FIG. 8 depicts a cross-sectional view of a photodiode (PD) chip array and the waveguide layer according to the second embodiment.

FIG. 8 depicts a cross-sectional view of the PD chip array 14 and the waveguide layer 162 according to the second embodiment. The above-mentioned configurations may also be applicable to any optical component (optoelectronic chip), such as the PD chip array 14. For example, as shown in FIG. 8, the PD chip array 14 may include a groove 145 on a bottom surface 14A along edges of the PD chip array 14. The groove 145 may prevent the adhesive 210 from flowing into the mirror cavities 165. In other words, the groove 145 may control the flow of the adhesive 210.

What is claimed is:

1. An optical structure, comprising:
   a substrate including a cavity and a hydrophobic area on a first surface of the substrate;
   an elongated optical component on the substrate including a recess along an edge of a second surface of the elongated optical component, the second surface being opposed to the first surface of the substrate and the recess being opposed to the hydrophobic area; and
   an adhesive applied along the elongated optical component in a longitudinal direction to fix the elongated optical component to the substrate, wherein the cavity is free of the adhesive responsive to the flow prevention of the recess and the hydrophobic area.

2. The optical structure of claim 1, wherein the recess surrounds an area on the second surface, and
   the area is a part of the second surface to be opposed to the cavity.

3. The optical structure of claim 1, wherein the substrate includes a hole,
   the elongated optical component includes a protrusion on the second surface, and
   at least a portion of the protrusion is inserted in the hole.

4. The optical structure of claim 3, further comprising a main substrate, the substrate being provided on the main substrate, wherein
   the elongated optical component is electrically connected with the main substrate via the protrusion in the hole of the substrate.

5. The optical structure of claim 4, wherein the adhesive infiltrates into a gap between the substrate and the elongated optical component due to capillary effect, and
   the recess prevents the adhesive from flowing into the hole.

6. The optical structure of claim 1, wherein the substrate includes a waveguide core and the cavity intersects the waveguide core, and
   an interface between the waveguide core and the cavity reflects a light passing through the waveguide core.

7. The optical structure of claim 6, wherein the cavity is filled with gas, and
   the light is reflected at the interface by total internal reflection.

8. The optical structure of claim 7, wherein the adhesive is located apart from a light path of light traveling between the elongated optical component and the interface.

9. The optical structure of claim 1, wherein the adhesive infiltrates into a gap between the substrate and the elongated optical component due to capillary effect, and
   the recess prevents the adhesive from flowing into the cavity.

10. A method for fabricating an optical structure, the method comprising:
    forming a substrate with a cavity and a hydrophobic area on a first surface of the substrate;
    forming an elongated optical component with a recess on a second surface of the elongated optical component;
    mounting the elongated optical component on the substrate, the second surface of the elongated optical component being opposed to the first surface of the substrate, the recess being on a periphery of the second surface with respect to an opposing area, the recess being opposed to the hydrophobic area, the opposing area being a part of the second surface to be opposed to the cavity;
    applying an adhesive along the elongated optical component in a longitudinal direction so that the adhesive infiltrates into a gap between the substrate and the elongated optical component;
    preventing the adhesive from flowing into the cavity using the recess and the hydrophobic area; and
    fixing the elongated optical component to the substrate with the adhesive.

11. The method of claim 10, further includes inserting at least a portion of a protrusion on the second surface of the elongated optical component into a hole included in the substrate.

12. The method of claim 11, further includes electrically connecting the elongated optical component to a main substrate on the substrate via the protrusion in the hole of the substrate.

13. The method of claim 12, wherein the adhesive infiltrates into a gap between the substrate and the elongated optical component due to capillary effect, and
    the recess prevents the adhesive from flowing into the hole.

14. The method of claim 10, further includes filling the cavity with a gas.

15. The method of claim 10, wherein the adhesive infiltrates into a gap between the substrate and the elongated optical component due to capillary effect, and the recess prevents the adhesive from flowing into the cavity.

* * * * *